US012644902B2

(12) United States Patent
Huening

(10) Patent No.: US 12,644,902 B2
(45) Date of Patent: Jun. 2, 2026

(54) SENSOR DEVICE FOR DETECTING A MAGNETIC FIELD, AND MAGNET-BASED SENSOR SYSTEM FOR DETECTING A MOVEMENT OF A MOVABLE OBJECT

(71) Applicant: FRABA B.V., Sg Heerlen (NL)

(72) Inventor: Felix Huening, Aachen (DE)

(73) Assignee: FRABA B.V., Sg Heerlen (NL)

( * ) Notice: Subject to any disclaimer, the term of this patent is extended or adjusted under 35 U.S.C. 154(b) by 182 days.

(21) Appl. No.: 18/726,122

(22) PCT Filed: Jan. 4, 2022

(86) PCT No.: PCT/EP2022/050076
§ 371 (c)(1),
(2) Date: Jul. 2, 2024

(87) PCT Pub. No.: WO2023/131396
PCT Pub. Date: Jul. 13, 2023

(65) Prior Publication Data
US 2025/0155467 A1 May 15, 2025

(51) Int. Cl.
*G01P 3/481* (2006.01)
*G01P 3/50* (2006.01)

(52) U.S. Cl.
CPC .............. *G01P 3/4815* (2013.01); *G01P 3/50* (2013.01)

(58) Field of Classification Search
None
See application file for complete search history.

(56) References Cited

U.S. PATENT DOCUMENTS

| | | | |
|---|---|---|---|
| 4,639,670 A | 1/1987 | Normann | |
| 2015/0130450 A1* | 5/2015 | Gehringer | ............ G01D 5/3473 |
| | | | 324/207.25 |
| 2022/0107336 A1 | 4/2022 | Loeken | |

FOREIGN PATENT DOCUMENTS

| | | |
|---|---|---|
| DE | 199 25 884 A1 | 12/2000 |
| WO | WO 2020/160766 A1 | 8/2020 |

* cited by examiner

*Primary Examiner* — Jas A Sanghera
(74) *Attorney, Agent, or Firm* — Norman B. Thot

(57) ABSTRACT

A sensor device for detecting a magnetic field. The sensor device includes a Wiegand sensor unit and a Wiegand trigger unit. The Wiegand sensor unit includes at least two Wiegand wires and a coil arrangement which is arranged to radially surround the at least two Wiegand wires. The coil arrangement provides a sensor element and a trigger element which generates a trigger magnetic field. The Wiegand trigger unit includes a Wiegand wire and a sensor coil which is arranged to radially surround the Wiegand wire. A first end of the sensor coil of the Wiegand trigger unit is electrically connected to a first end of the trigger element of the Wiegand sensor unit, and a second end of the sensor coil of the Wiegand trigger unit is electrically connected to a second end of the trigger element of the Wiegand sensor unit.

7 Claims, 4 Drawing Sheets

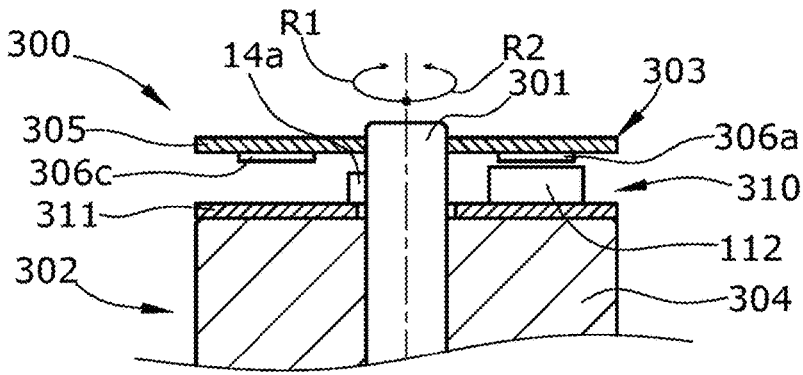
Fig. 4
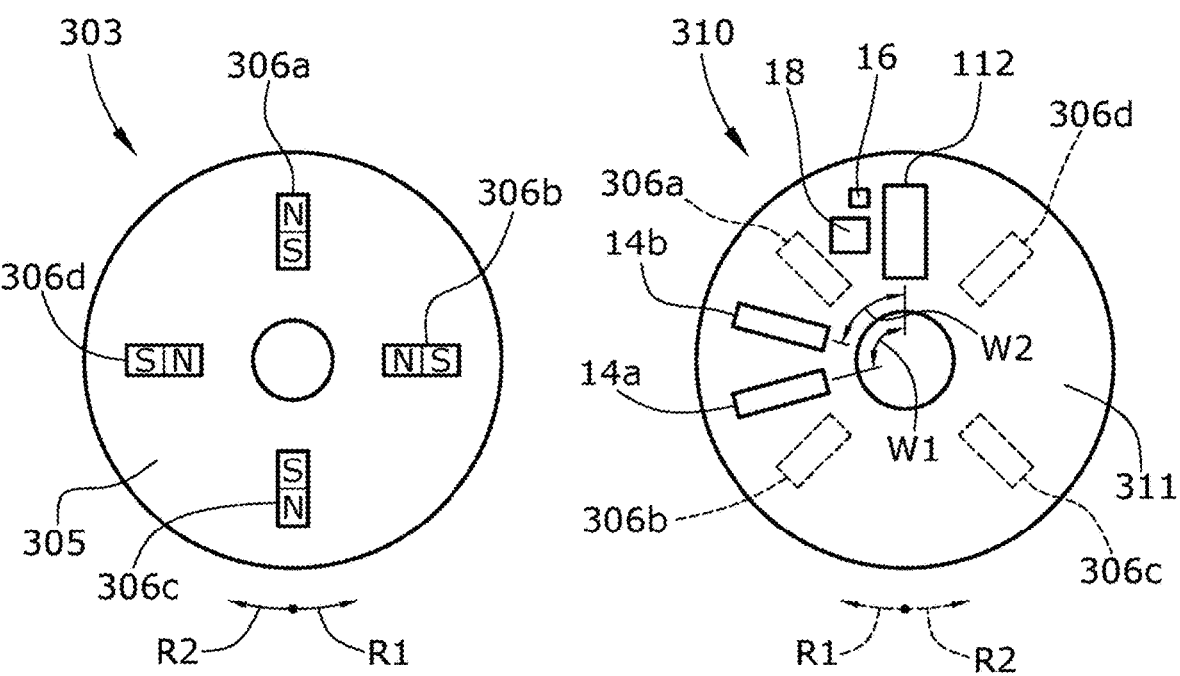
Fig. 5          Fig. 6

SENSOR DEVICE FOR DETECTING A MAGNETIC FIELD, AND MAGNET-BASED SENSOR SYSTEM FOR DETECTING A MOVEMENT OF A MOVABLE OBJECT

CROSS REFERENCE TO PRIOR APPLICATIONS

This application is a U.S. National Phase application under 35 U.S.C. § 371 of International Application No. PCT/EP2022/050076, filed on Jan. 4, 2022. The International Application was published in German on Jul. 13, 2023 as WO 2023/131396 A1 under PCT Article 21(2).

FIELD

The present invention relates to a sensor device for detecting a magnetic field with a Wiegand sensor unit comprising at least two Wiegand wires and a coil arrangement which radially surrounds the at least two Wiegand wires. The present invention further relates to magnet-based sensor systems comprising such a sensor device and an excitation device with at least one excitation magnet for generating an excitation magnetic field, wherein either the sensor device or the excitation device is configured to be connected to the movable object so as to move therewith, and the respective other is configured to be arranged stationary.

BACKGROUND

Such sensor systems are, for example, angle of rotation measuring systems for detecting the rotational movement of a shaft. The excitation device is typically attached to the shaft, and the sensor device is arranged to be stationary, wherein the excitation magnetic field generated by the excitation device is detected by the Wiegand sensor unit of the sensor device. For this purpose, the Wiegand sensor unit has at least two Wiegand wires the direction of magnetization of which reverses abruptly under the influence of an external magnetic field as soon as a specific trigger field strength is exceeded. As a result, a short voltage pulse, also known as a Wiegand pulse, is generated in the coil arrangement that radially surrounds the at least two Wiegand wires. This effect is referred to as the "Wiegand effect" and is well known from the state of the art.

Wiegand wires within the meaning of the present application are also referred to as impulse wires and generally have a hard magnetic shell and a soft magnetic core or vice versa. The reversal of the direction of magnetization of a Wiegand wire is hereinafter also referred to as the "triggering" of the Wiegand wire.

The voltage pulses generated in the coil arrangement can be evaluated by a subsequent electronics, for example, to determine an (incremental) angle of rotation and/or a rotational speed of the shaft based on the number and/or frequency of the voltage pulses. The electrical energy of the generated voltage pulses is sufficient to enable at least the operation of relatively simple subsequent electronics without an external energy supply. The more Wiegand wires the Wiegand sensor unit has, the greater is the electrical energy generated by the Wiegand sensor unit.

Due to the manufacturing process, however, the individual Wiegand wires usually have different specific trigger field strengths, so that the Wiegand wires trigger at different local field strengths of the external magnetic field and thus at slightly different angular positions of the shaft. This can result in one part of the Wiegand wires triggering at a defined rotational angle position of the shaft, while another part of the Wiegand wires does not trigger. This can falsify the measurement results of the sensor device and also result in insufficient electrical energy being generated for a proper operation of the subsequent electronics in the case of a sensor device without an external power supply.

Against this background, WO 2020/160766 A1 describes a sensor device in which the coil arrangement of the Wiegand sensor unit forms a sensor element, the electrical voltage of which is evaluated to detect the rotary movement and is used for the energy supply, and forms a trigger element, via which a trigger magnetic field that is in the same direction as the external magnetic field can be generated. The disclosed sensor device further comprises an energy storage which can be electrically connected to the trigger element as required via a switching element. The electrical energy generated in the sensor element of the coil arrangement by a first Wiegand wire, which has a relatively low trigger field strength, is temporarily stored in the energy storage and can be used, if required, to energize the trigger element of the coil arrangement in order to generate the trigger magnetic field. The total magnetic field, i.e., the sum of the external magnetic field and the trigger magnetic field, then exceeds the trigger field strength of all other Wiegand wires so that it can be provided that all Wiegand wires of the Wiegand sensor unit are triggered as soon as the trigger field strength of at least one Wiegand wire is exceeded. Relatively complex control electronics are, however, required for the precise control of the switching element, which requires additional electrical energy to be operated and increases the manufacturing costs.

SUMMARY

An aspect of the present invention is to provide a magnet-based sensor system for detecting a movement of a movable object that operates reliably and energy-efficiently without an external energy supply and that can be manufactured cost-effectively.

In an embodiment, the present invention provides a sensor device for detecting a magnetic field. The sensor device includes a Wiegand sensor unit and a Wiegand trigger unit. The Wiegand sensor unit comprises at least two Wiegand wires and a coil arrangement which is arranged to radially surround the at least two Wiegand wires. The coil arrangement provides a sensor element and a trigger element which is configured to generate a trigger magnetic field. The Wiegand trigger unit comprises a Wiegand wire and a sensor coil which is arranged to radially surround the Wiegand wire. A first end of the sensor coil of the Wiegand trigger unit is electrically connected to a first end of the trigger element of the Wiegand sensor unit. A second end of the sensor coil of the Wiegand trigger unit is electrically connected to a second end of the trigger element of the Wiegand sensor unit.

BRIEF DESCRIPTION OF THE DRAWINGS

The present invention is described in greater detail below on the basis of embodiments and of the drawings in which:

FIG. 4 is a schematic representation of a first embodiment of a magnet-based sensor system according to the present invention;

FIG. 5 is a schematic representation of an excitation device of the sensor system from FIG. 4;

FIG. 6 is a schematic representation of a sensor device of the sensor system from FIG. 4;

DETAILED DESCRIPTION

Figure 1:
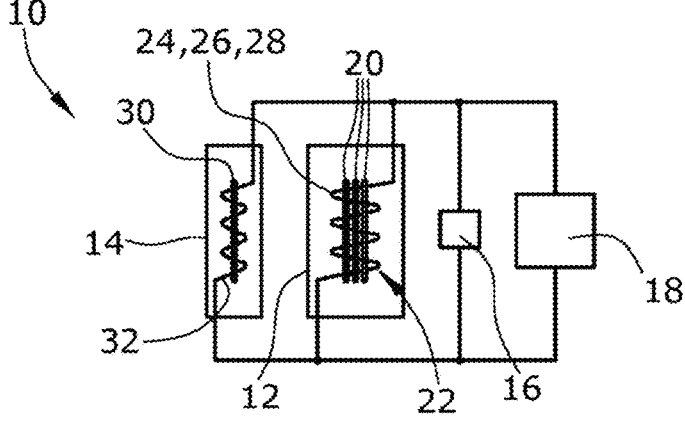
FIG. 1 is a schematic circuit diagram of a first embodiment of a sensor device according to the present invention.

The sensor device according to the present invention comprises a Wiegand trigger unit with a Wiegand wire and with a sensor coil which radially surrounds the Wiegand wire, wherein a first end of the sensor coil of the Wiegand trigger unit is electrically connected to a first end of the trigger element of the coil arrangement of the Wiegand sensor unit, and a second end of the sensor coil of the Wiegand trigger unit is electrically connected to a second end of the trigger element of the coil arrangement of the Wiegand sensor unit. The sensor coil of the Wiegand trigger unit and the trigger element of the coil arrangement of the Wiegand sensor unit are thus electrically connected to each other so that the trigger element of the coil arrangement of the Wiegand sensor unit is energized by a voltage pulse generated in the sensor coil of the Wiegand trigger unit.

As soon as the, for example, exactly one Wiegand wire of the Wiegand trigger unit triggers under the influence of the external magnetic field, the trigger element of the coil arrangement is energized and a trigger magnetic field acting on the at least two Wiegand wires of the Wiegand sensor unit is thereby generated. The Wiegand trigger unit and the trigger element of the coil arrangement of the Wiegand sensor unit are designed according to the present invention so that a total magnetic field acting on the at least two Wiegand wires of the Wiegand sensor unit exceeds the trigger field strength of each individual Wiegand wire of the Wiegand sensor unit. This provides that all Wiegand wires of the Wiegand sensor unit trigger essentially simultaneously. This provides that the voltage pulses generated in the sensor element of the coil arrangement of the Wiegand sensor unit can be reliably evaluated and that the Wiegand sensor unit always generates essentially the same electrical energy. This provides a sensor device that operates reliably without an external power supply.

Due to the Wiegand trigger unit according to the present invention, neither a switching element nor a complex control unit for controlling the switching element is required to generate the trigger magnetic field. This provides a sensor device that operates in a particularly energy-efficient manner which can also be manufactured cost-effectively.

The sensor device according to the present invention therefore provides a magnet-based sensor system for detecting the movement of a movable object which operates reliably and energy-efficiently without an external energy supply and which can be manufactured cost-effectively.

In an embodiment of the sensor device according to the present invention, the coil arrangement of the Wiegand sensor unit comprises a sensor coil, which radially surrounds the at least two Wiegand wires and which forms the sensor element, and a separate trigger coil, which also radially surrounds the at least two Wiegand wires and which forms the trigger element. The sensor coil and the trigger coil can be optimized independently of each other for the respective function, i.e., the generation of the Wiegand pulses on the one hand and the generation of the trigger magnetic field on the other. This provides a sensor device that operates particularly reliably and energy-efficiently.

The sensor coil and the trigger coil of the coil arrangement of the Wiegand sensor unit can, for example, be arranged side by side with respect to an axial direction of the at least two Wiegand wires of the Wiegand sensor unit. The trigger coil of the Wiegand sensor unit can, for example, have a smaller extension in the axial direction of the at least two Wiegand wires than the sensor coil of the Wiegand sensor unit. Due to the side-by-side arrangement of the sensor coil and the trigger coil, the generation of the voltage pulses in the sensor coil is only minimally affected by the trigger coil when the at least two Wiegand wires are triggered. This provides a sensor device that operates particularly reliably.

In an embodiment of the present invention, the sensor coil and the trigger coil of the coil arrangement of the Wiegand sensor unit can, for example, be arranged one inside the other. The sensor coil can here be arranged radially inside the trigger coil, the trigger coil can be arranged radially inside the sensor coil, or the windings of the trigger coil and the windings of the sensor coil can be formed inside each other with respect to the axial direction, i.e., "wound into each other". This provides a relatively compact sensor device.

In an embodiment of the sensor device according to the present invention, the coil arrangement of the Wiegand sensor unit can, for example, comprise only one single combined coil which radially surrounds the at least two Wiegand wires and which forms both the sensor element and the trigger element. This provides a particularly compact and cost-effective sensor device. With this design, a higher electrical voltage and thus more electrical energy is generated in the sensor element of the coil arrangement when the Wiegand wires are triggered as compared to a coil arrangement with a sensor coil and a separate trigger coil.

The sensor system according to the present invention comprises an excitation device with at least one excitation magnet for generating an excitation magnets field and a sensor device according to the present invention as described above. Either the excitation device or the sensor device is configured to be connected to the movable object so as to move therewith, and the other is configured to be arranged stationary so that the excitation magnetic field generated by the excitation device at a defined position of the sensor device changes with the movement of the movable object. The excitation device and the sensor device are in particular designed so that an alternating excitation magnetic field is generated both at the position of the Wiegand trigger unit of the sensor device and at the position of the Wiegand sensor unit of the sensor device during a continuous movement of the movable object.

According to the present invention, the Wiegand trigger unit and the Wiegand sensor unit of the sensor device are arranged displaced relative to one another in the direction of movement so that, during the movement of the movable object in the direction of movement, a component of the excitation magnetic field acting on the Wiegand wire of the Wiegand trigger unit, i.e., the component of the local excitation magnetic field at the position of the Wiegand trigger unit which is parallel to the Wiegand wire of the Wiegand trigger unit, reaches a defined trigger field strength before a component of the excitation magnetic field acting on the at least two Wiegand wires of the Wiegand sensor unit, i.e., the component of the local excitation magnetic field at the position of the Wiegand trigger unit which is parallel to the at least two Wiegand wires of the Wiegand sensor unit, reaches the defined trigger field strength. The Wiegand trigger unit can, for example, be arranged in front of the Wiegand sensor unit in the direction of movement so that the Wiegand trigger unit passes an excitation magnet of the excitation device always prior to the Wiegand sensor unit. If the excitation device has more than one excitation magnet, it is also conceivable, however, that the Wiegand trigger unit and the Wiegand sensor unit are arranged displaced to each other so that they detect the local excitation magnetic field of different excitation magnets. The Wiegand trigger unit is in this case typically arranged displaced relative to the Wiegand sensor unit so that a displacement in the direction of movement between the Wiegand trigger unit and the Wiegand sensor unit is greater than a displacement in the direction of movement between the respective excitation magnets, so that the Wiegand trigger unit passes one excitation magnet before the Wiegand sensor unit passes the respective other excitation magnet.

The arrangement of the Wiegand trigger unit and the Wiegand sensor unit according to the present invention causes the trigger magnetic field, which is generated by energizing the trigger element of the Wiegand sensor unit with the energy of the voltage pulse generated in the sensor coil of the Wiegand trigger unit, to act on the at least two Wiegand wires of the Wiegand sensor module at the moment when the component of the excitation magnetic field acting on the at least two Wiegand wires is at its maximum. This provides that all Wiegand wires of the Wiegand sensor module trigger essentially simultaneously so that the voltage pulses generated in the sensor element of the coil arrangement of the Wiegand sensor unit can be reliably evaluated and always have essentially the same electrical energy. This provides a sensor system that provides the detection of movements of the movable object in a direction of movement, that operates reliably and energy-efficiently without an external energy supply, and that can be manufactured cost-effectively.

The sensor system can, for example, be configured to detect the movement of the movable object in a further direction of movement. The sensor device in this case advantageously additionally comprises a further Wiegand trigger unit with a Wiegand wire and with a sensor coil that radially surrounds the Wiegand wire. A first end of the sensor coil of the further Wiegand trigger unit is electrically connected to the first end of the trigger element of the Wiegand sensor unit, and a second end of the sensor coil of the further Wiegand trigger unit is electrically connected to the second end of the trigger element of the Wiegand sensor unit, so that voltage pulses generated in the sensor coil of the further Wiegand trigger unit, in analogy to the function of the (first) Wiegand trigger unit, also generate a trigger magnetic field acting on the at least two Wiegand wires of the Wiegand sensor unit.

The further Wiegand trigger unit is arranged displaced relative to the Wiegand sensor unit in the further direction of movement so that, during the movement of the movable object in the further direction of movement, a component of the excitation magnetic field acting on the Wiegand wire of the further Wiegand trigger unit reaches the defined trigger field strength before the component of the excitation magnetic field acting on the at least two Wiegand wires of the Wiegand sensor unit reaches the defined trigger field strength. This provides that the trigger magnetic field and the excitation magnetic field generated by the excitation magnet act on the at least two Wiegand wires of the Wiegand sensor module essentially simultaneously for both directions of movement. For example, the further Wiegand trigger unit can be arranged in front of the Wiegand sensor unit in the further direction of movement, or a displacement between the further Wiegand trigger unit and the Wiegand sensor unit in the further direction of movement can be greater than a displacement between respective excitation magnets of the excitation device in the further direction of movement. During a movement in the first direction of movement, the trigger element is energized by the voltage pulses generated in the sensor coil of the (first) Wiegand trigger unit to generate the trigger magnetic field, and during a movement in the second direction of movement, the trigger element is energized by the voltage pulses generated in the sensor coil of the further Wiegand trigger unit to generate the trigger magnetic field. This provides a sensor system that provides a reliable detection of movements of the movable object in two different directions of movement.

Different embodiments of the present invention are described below with reference to the enclosed drawings.

FIG. 1 shows a sensor device 10 for detecting a magnetic field according to the present invention. The sensor device 10 comprises a Wiegand sensor unit 12, a Wiegand trigger unit 14, an energy storage 16, and an evaluation unit 18.

The Wiegand sensor unit 12 comprises three Wiegand wires 20 and a coil arrangement 22 that radially surrounds the three Wiegand wires 20. In the present embodiment, the coil arrangement 22 comprises one single combined coil 24 which forms both a sensor element 26 and a trigger element 28 of the coil arrangement 22. The combined coil 24 is designed so that a trigger magnetic field acting on the three Wiegand wires 20 is generated by energizing the combined coil 24 and so that a voltage pulse is generated in the combined coil 24 each time when the three Wiegand wires 20 are triggered.

The Wiegand trigger unit 14 comprises one single Wiegand wire 30 and a sensor coil 32 surrounding the Wiegand wire 30. The sensor coil 32 is designed so that a voltage pulse is generated in the sensor coil 32 if the Wiegand wire 30 is triggered. A first end of the sensor coil 32 is electrically connected to a first end of the combined coil 24, and a second end of the sensor coil 32 is electrically connected to a second end of the combined coil 24.

The energy storage 16 is electrically connected to the first end of the combined coil 24 and to the second end of the combined coil 24 so that electrical energy from voltage pulses generated in the combined coil 24 by the triggering of the three Wiegand wires 20 can be stored in the energy storage 16.

The evaluation unit 18 is electrically connected to the first end of the combined coil 24 and to the second end of the combined coil 24 so that voltage pulses generated in the combined coil 24 by the triggering of the three Wiegand wires 20 can be evaluated by the evaluation unit 18.

Figure 2:
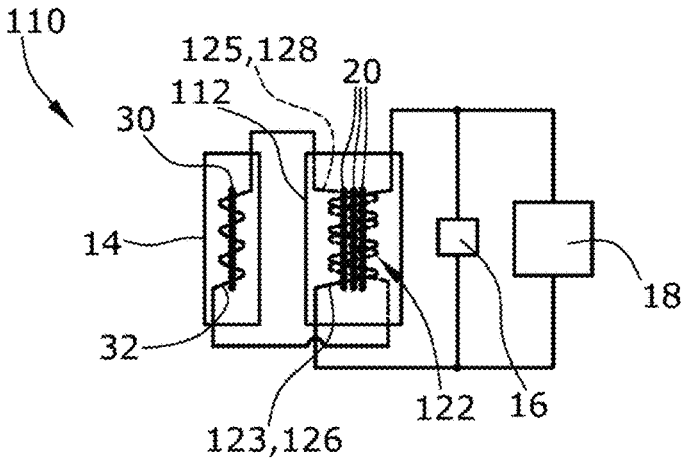
FIG. 2 is a schematic circuit diagram of a second embodiment of a sensor device according to the present invention.

FIG. 2 shows an alternative sensor device 110 for detecting a magnetic field according to the present invention. The sensor device 110 differs from the sensor device 10 of FIG. 1 mainly in that a coil arrangement 122 of a Wiegand sensor unit 112 of the sensor device 110 comprises a sensor coil 123 and a separate trigger coil 125, which are arranged one inside the other. More specifically, the sensor coil 123 and the trigger coil 125 are designed so that their windings are formed inside each other with respect to an axial direction of the three Wiegand wires 20. The sensor coil 123 forms a sensor element 126 of the coil arrangement 122, and the trigger coil 125 forms a trigger element 128 of the coil arrangement 122. The first end of the sensor coil 32 of the Wiegand trigger unit 14 is electrically connected to a first end of the trigger coil 125, and the second end of the sensor coil 32 is electrically connected to a second end of the trigger coil 125. The energy storage 16 and the evaluation unit 18 of the sensor device 110 are each electrically connected to the first end of the sensor coil 123 and to the second end of the sensor coil 123 of the Wiegand sensor unit 112.

Figure 3:
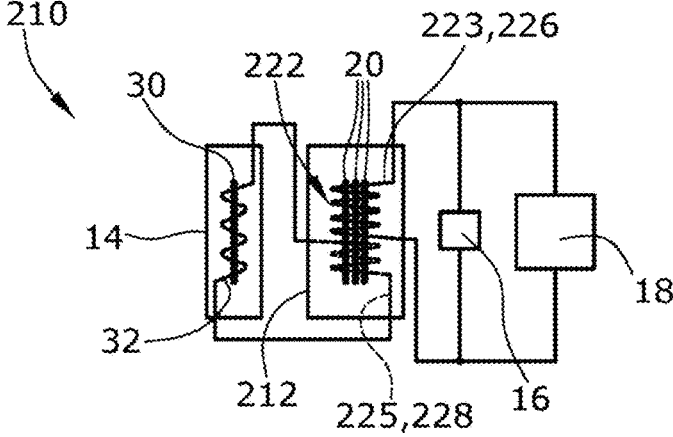
FIG. 3 is a schematic circuit diagram of a third embodiment of a sensor device according to the present invention.
Figure 7:
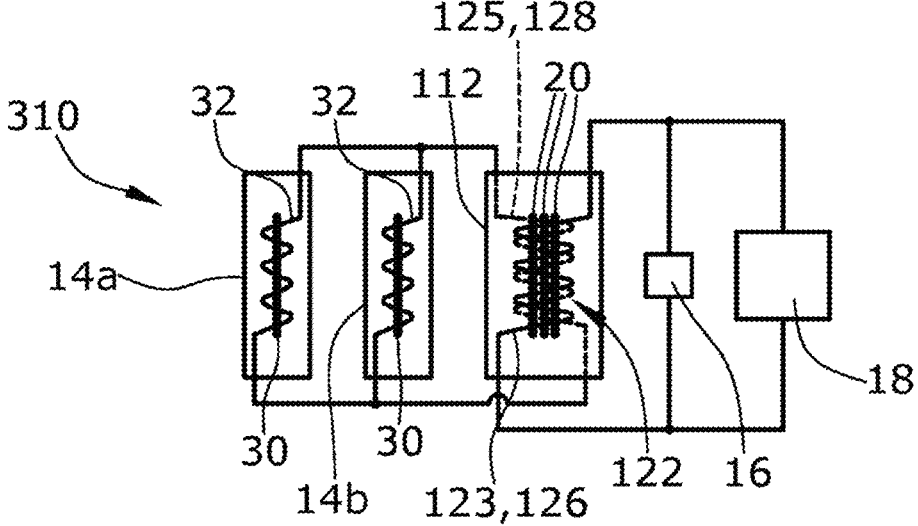
FIG. 7 is a schematic circuit diagram of the sensor device from FIG. 6.

FIG. 3 shows a further sensor device 210 for detecting a magnetic field according to the present invention. The sensor device 210 differs from the sensor device 110 of FIG. 2 mainly in that a sensor coil 223 and a trigger coil 225 of a coil arrangement 222 of a Wiegand sensor unit 212 of the sensor device 210 are arranged side by side with respect to the axial direction of the three Wiegand wires 20, thus radially surrounding different axial sections of the three Wiegand wires 20. The sensor coil 223 forms a sensor element 226 of the coil arrangement 222, and the trigger coil 225 forms a trigger element 228 of the coil arrangement 222. The first end of the sensor coil 32 of the Wiegand trigger unit 14 is electrically connected to a first end of the trigger coil 225, and the second end of the sensor coil 32 is electrically connected to a second end of the trigger coil 225. The energy storage 16 and the evaluation unit 18 of the sensor device 210 are each electrically connected to the first end of the sensor coil 223 and to the second end of the sensor coil 223 of the Wiegand sensor unit 212.

FIG. 4 shows a magnet-based sensor system 300 for detecting a movement of a movable object 301 in a first direction of movement R1 and a second direction of movement R2 opposite to the first direction of movement, according to the present invention. The movable object 301 is a shaft of an electric motor 302, the first direction of movement R1 is a first circumferential direction of the shaft, and the second direction of movement R2 is a second circumferential direction of the shaft.

The sensor system 300 comprises an excitation device 303 which is attached to the movable object 301 so as to move therewith, and a sensor device 310 which is attached to a stationary housing part 304 of the electric motor 302.

The excitation device 303 comprises a disk-shaped support element 305, which radially surrounds the movable object 301 and is attached thereto. The excitation device 303 comprises four permanent-magnetic excitation magnets 306a-d, which are arranged on a surface of the support element 305 that faces the sensor device 310. The four excitation magnets 306a-d are evenly distributed along the circumference of the movable object 301, thereby each having an angular distance of substantially 90° from each other. The four excitation magnets 306a-d are designed and arranged so that excitation magnets 306a-d lying side by side in the circumferential direction of the movable object 301 have a substantially opposite magnetization in the radial direction of the movable object 301, i.e., each have different magnetic polarities N,S (N: magnetic north pole, S: magnetic south pole) on their radially inner side and each have different magnetic polarities N,S on their radially outer side. The excitation magnets 306a d therefore, at a given position of the sensor device 310, generate an excitation magnetic field which changes, in particular alternates, when the movable object 301 moves in the first direction of movement R1 or in the second direction of movement R2.

The sensor device 310 comprises a disk-shaped circuit board 311 which radially surrounds the movable object 301 and which is attached to the housing part 304. The sensor device comprises the Wiegand sensor unit 112 from FIG. 2, two Wiegand trigger units 14a, 14b, each of which is designed substantially identically to the Wiegand trigger unit 14 from FIGS. 1 to 3, as well as the energy storage 16 and the evaluation unit 18 from FIGS. 1 to 3.

A first end of the sensor coil 32 of both Wiegand trigger units 14a, 14b is electrically connected to a first end of the trigger coil 125 of the Wiegand sensor unit 112, respectively, and a second end of the sensor coil 32 of both Wiegand trigger units 14a, 14b is electrically connected to a second end of the trigger coil 125 of the Wiegand sensor unit 112, respectively.

The Wiegand sensor unit 112 and the two Wiegand trigger units 14a, 14b are arranged on a surface of the circuit board 311 that faces the excitation device 303. The first Wiegand trigger unit 14a is arranged at an angular distance W1 of slightly more than 90° from the Wiegand sensor unit 112, and the second Wiegand trigger unit 14b is arranged at an angular distance W2 of slightly less than 90° from the Wiegand sensor unit 112.

Therefore, during a movement of the movable object 301 and consequently of the excitation device 303 in the first direction of movement R1, one of the excitation magnets 306a-d (for the location shown in FIG. 6, the second excitation magnet 306b) always passes the first Wiegand trigger unit 14a before the excitation magnet 306a-d that is adjacent in the first direction of movement R1 (for the location shown in FIG. 6, the first excitation magnet 306a) passes the Wiegand sensor unit 112. During the movement of the movable object 301 in the first direction of movement R1, a component of the excitation magnetic field acting on the Wiegand wire 30 of the first Wiegand trigger unit 14a thus always reaches a defined trigger field strength before a component of the excitation magnetic field acting on the three Wiegand wires 20 of the Wiegand sensor unit 112 reaches the defined trigger field strength.

Likewise, during a movement of the movable object 301 and consequently of the excitation device 303 in the second direction of movement R2, one of the excitation magnets 306a-d (for the location shown in FIG. 6, the first excitation magnet 306a) always passes the second Wiegand trigger unit 14b before the excitation magnet 306a-d that is adjacent in the first direction of movement R1 (for the location shown in FIG. 6, the fourth excitation magnet 306d) passes the Wiegand sensor unit 112. During the movement of the movable object 301 in the second direction of movement R2, the component of the excitation magnetic field acting on the Wiegand wire 30 of the second Wiegand trigger unit 14b thus always reaches the defined trigger field strength before the component of the excitation magnetic field acting on the three Wiegand wires 20 of the Wiegand sensor unit 112 reaches the defined trigger field strength.

Figure 8:
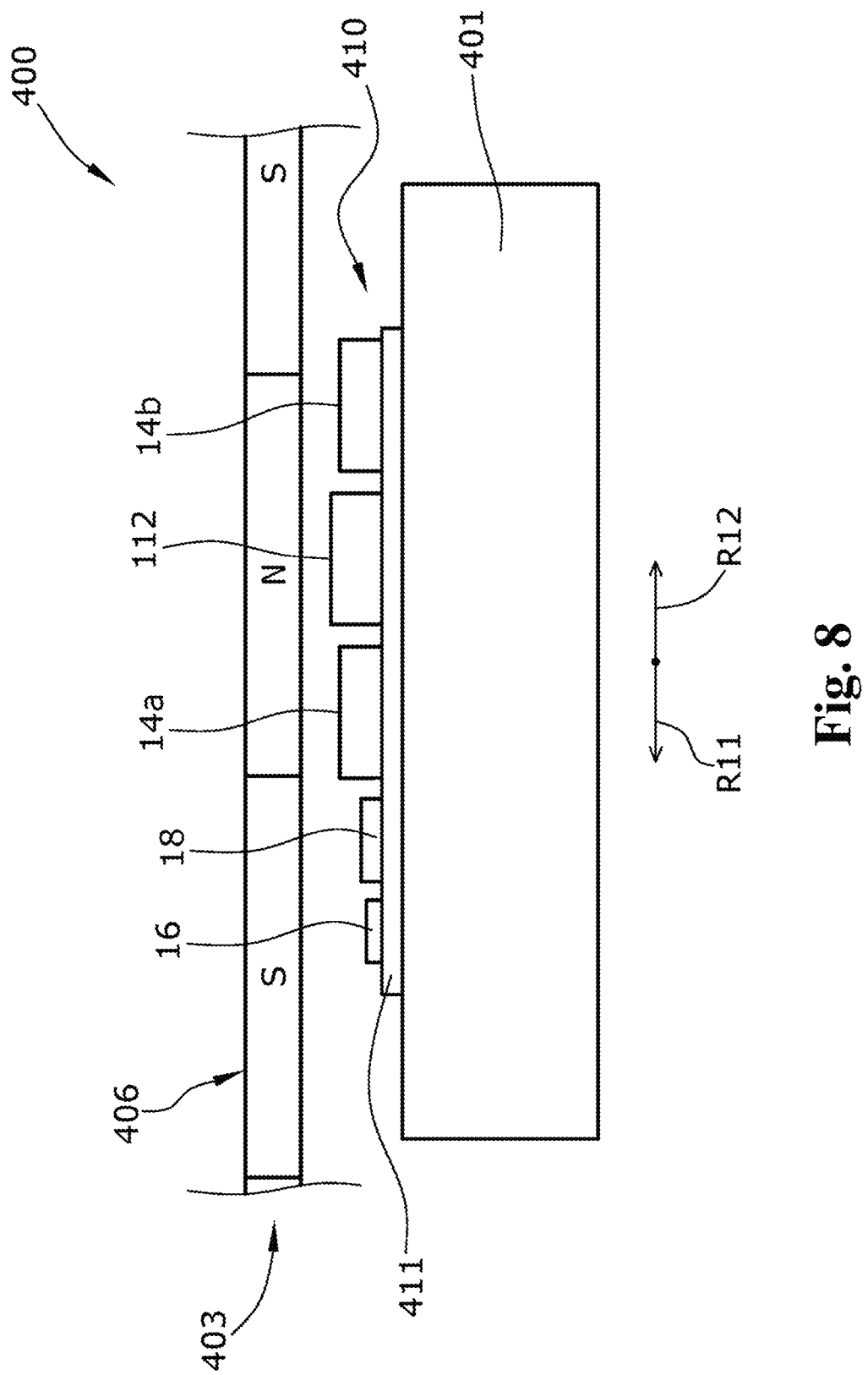
FIG. 8 is a schematic representation of a second embodiment of a magnet-based sensor system according to the present invention.

FIG. 8 shows an alternative magnet-based sensor system 400 for detecting a linear movement of a movable object 401 in a first direction of movement R11 and a second direction of movement R12 that is opposite to the first direction of movement, according to the present invention.

The sensor system 400 comprises an excitation device 403 which is arranged to be stationary and a sensor device 410 which is attached to the movable object 401 so as to move therewith.

The excitation device 403 comprises a longitudinal excitation magnet 406 which extends substantially parallel to the axis of movement of the movable object 401 and which has an alternating sequence of magnetic north poles N and magnetic south poles S. The excitation magnet 406 may be one single permanent-magnetic body or may consist of several permanent magnets arranged side by side. The excitation magnet 406, at a given position of the sensor device 410, generates an excitation magnetic field which changes, in particular alternates, when the movable object 401 moves in the first direction of movement R11 or in the second direction of movement R12.

The sensor device 410 is designed substantially analogous to the sensor device 310 from FIGS. 4 to 7. The sensor device 410 differs from the sensor device 310 mainly by the arrangement of the individual components, in particular by the arrangement of the two Wiegand trigger units 14a, 14b and the Wiegand sensor unit 112, on a circuit board 411. In the sensor device 410, the first Wiegand trigger unit 14a is arranged directly in front of the Wiegand sensor unit 112 in the first direction of movement R11, and the second Wiegand trigger unit 14b is arranged directly in front of the Wiegand sensor unit 112 in the second direction of movement R12.

Consequently, during a movement of the movable object 401 and the sensor device 410 in the first direction of movement R11, the first Wiegand trigger unit 14a always passes areas with a maximum excitation magnetic field before the Wiegand sensor unit 112 passes them, and during a movement of the movable object 401 and the sensor device 410 in the second direction of movement R12, the second Wiegand trigger unit 14b always passes the areas with a maximum excitation magnetic field before the Wiegand sensor unit 112 passes them. During the movement of the movable object 401 in the first direction of movement R11, the component of the excitation magnetic field acting on the Wiegand wire 30 of the first Wiegand trigger unit 14a thus always reaches the defined trigger field strength before the component of the excitation magnetic field acting on the three Wiegand wires 20 of the Wiegand sensor unit 112 reaches the defined trigger field strength, and during the movement of the movable object 401 in the second direction of movement R12, the component of the excitation magnetic field acting on the Wiegand wire 30 of the second Wiegand trigger unit 14b thus always reaches the defined trigger field strength before the component of the excitation magnetic field acting on the three Wiegand wires 20 of the Wiegand sensor unit 112 reaches the defined trigger field strength.

The present invention is not limited to embodiments described herein; reference should be had to the appended claims.

LIST OF REFERENCE NUMERALS 10 sensor device
12 Wiegand sensor unit
14 Wiegand trigger unit
14a first Wiegand trigger unit
14b second Wiegand trigger unit
16 energy storage
18 evaluation unit
20 (three) Wiegand wires
22 coil arrangement
24 combined coil
26 sensor element
28 trigger element
30 Wiegand wire
32 sensor coil
110 sensor device
112 Wiegand sensor unit
122 coil arrangement
123 sensor coil
125 trigger coil
126 sensor element
128 trigger element 210 sensor device
212 Wiegand sensor unit
222 coil arrangement
223 sensor coil
225 trigger coil
226 sensor element
228 trigger element
300 sensor system
301 movable object
302 electric motor
303 excitation device
304 housing part
305 support element
306a first excitation magnet
306b second excitation magnet
306c third excitation magnet
306d fourth excitation magnet
310 sensor device
311 circuit board
R1 first direction of movement
R2 second direction of movement
W1 angular distance
W2 angular distance
400 sensor system
401 movable object
403 excitation device
406 excitation magnets
410 sensor device
411 circuit board
R11 first direction of movement
R12 second direction of movement

What is claimed is:

1. A sensor device for detecting a magnetic field, the sensor device comprising:

a Wiegand sensor unit comprising at least two Wiegand wires and a coil arrangement which is arranged to radially surround the at least two Wiegand wires, the coil arrangement providing a sensor element and a trigger element which is configured to generate a trigger magnetic field; and a Wiegand trigger unit comprising a Wiegand wire and a sensor coil which is arranged to radially surround the Wiegand wire, wherein, a first end of the sensor coil of the Wiegand trigger unit is electrically connected to a first end of the trigger element of the Wiegand sensor unit, and a second end of the sensor coil of the Wiegand trigger unit is electrically connected to a second end of the trigger element of the Wiegand sensor unit.

2. The sensor device as recited in claim 1, wherein the coil arrangement of the Wiegand sensor unit comprises:

a sensor coil which is arranged to radially surround the at least two Wiegand wires and which provides the sensor element; and a separate trigger coil which is arranged to radially surround the at least two Wiegand wires and which provides the trigger element.

3. The sensor device as recited in claim 2, wherein the sensor coil and the separate trigger coil of the coil arrangement of the Wiegand sensor unit are arranged side by side with respect to an axial direction of the at least two Wiegand wires of the Wiegand sensor unit.

4. The sensor device as recited in claim 2, wherein the sensor coil and the separate trigger coil of the coil arrangement of the Wiegand sensor unit are arranged one inside the other.

5. The sensor device as recited in claim 1, wherein the coil arrangement of the Wiegand sensor unit comprises one single combined coil which is arranged to radially surround the at least two Wiegand wires and which provides both the sensor element and the trigger element.

6. A magnet-based sensor system for detecting a movement of a movable object in a direction of movement, the magnet-based sensor system comprising:

an excitation device comprising at least one excitation magnet which is configured to generate an excitation magnetic field; and the sensor device as recited in claim 1, wherein, either the excitation device or the sensor device is configured to be connected to the movable object so as to move therewith, and the respective other one of the excitation device or the sensor device is arranged to be stationary, and the Wiegand trigger unit and the Wiegand sensor unit of the sensor device are arranged displaced with respect to each other in the direction of movement so that, during a movement of the movable object in the direction of movement, a component of the excitation magnetic field acting on the Wiegand wire of the Wiegand trigger unit reaches a defined trigger field strength before a component of the excitation magnetic field acting on the at least two Wiegand wires of the Wiegand sensor unit reaches the defined trigger field strength.

7. The magnet-based sensor system as recited in claim 6, wherein the magnet-based sensor system further detects a movement of the movable object in a further direction of movement, wherein, the sensor device further comprises a further Wiegand trigger unit which comprises a Wiegand wire and a sensor coil which is arranged to radially surround the Wiegand wire, a first end of the sensor coil of the further Wiegand trigger unit is electrically connected to the first end of the trigger element of the Wiegand sensor unit, a second end of the sensor coil of the further Wiegand trigger unit is electrically connected to the second end of the trigger element of the Wiegand sensor unit, and the further Wiegand trigger unit is arranged displaced in the further direction of movement relative to the Wiegand sensor unit so that, during a movement of the movable object in the further direction of movement, a component of the excitation magnetic field acting on the Wiegand wire of the further Wiegand trigger unit reaches the defined trigger field strength before the component of the excitation magnetic field acting on the at least two Wiegand wires of the Wiegand sensor unit reaches the defined trigger field strength.

* * * * *